(12) United States Patent
Ros Sanchez et al.

(10) Patent No.: US 9,916,522 B2
(45) Date of Patent: Mar. 13, 2018

(54) TRAINING CONSTRAINED DECONVOLUTIONAL NETWORKS FOR ROAD SCENE SEMANTIC SEGMENTATION

(71) Applicant: Kabushiki Kaisha Toshiba, Minato-ku (JP)

(72) Inventors: German Ros Sanchez, Cambridge (GB); Simon Stent, Cambridge (GB); Pablo Alcantarilla, Cambridge (BG)

(73) Assignee: Kabushiki Kaisha Toshiba, Minato-ku (JP)

( * ) Notice: Subject to any disclaimer, the term of this patent is extended or adjusted under 35 U.S.C. 154(b) by 129 days.

(21) Appl. No.: 15/090,984

(22) Filed: Apr. 5, 2016

(65) Prior Publication Data
US 2017/0262735 A1    Sep. 14, 2017

Related U.S. Application Data

(60) Provisional application No. 62/306,975, filed on Mar. 11, 2016.

(51) Int. Cl.
*G06K 9/62* (2006.01)
*G06N 3/08* (2006.01)
(Continued)

(52) U.S. Cl.
CPC ......... *G06K 9/6256* (2013.01); *G05D 1/0088* (2013.01); *G06K 9/481* (2013.01); *G06K 9/628* (2013.01); *G06K 9/6277* (2013.01); *G06N 3/08* (2013.01); *G06N 3/088* (2013.01); *G06N 99/005* (2013.01); *G06T 7/0081* (2013.01);
(Continued)

(58) Field of Classification Search
CPC ...... G05D 1/008; G06K 9/481; G06K 9/6256; G06K 9/6277; G06K 9/628; G06N 3/088; G06N 99/005; G06T 7/10; G06T 2207/20004; G06T 2207/20081; G06T 2207/20084; G06T 2207/30252; H04N 19/91
See application file for complete search history.

(56) References Cited

U.S. PATENT DOCUMENTS 5,832,468 A * 11/1998 Miller .................. G05B 13/027
706/16
6,330,546 B1 * 12/2001 Gopinathan ........... G06Q 20/00
705/35
(Continued)

OTHER PUBLICATIONS

Noh et al. ("Learning Deconvolution Network for Semantic Segmentation," IEEE International Conference on Computer Vision, Dec. 7-13, 2015, pp. 1520-1528).*
(Continued)

*Primary Examiner* — Yubin Hung
(74) *Attorney, Agent, or Firm* — Oblon, McClelland, Maier & Neustadt, L.L.P.

(57) ABSTRACT

A source deconvolutional network is adaptively trained to perform semantic segmentation. Image data is then input to the source deconvolutional network and outputs of the S-Net are measured. The same image data and the measured outputs of the source deconvolutional network are then used to train a target deconvolutional network. The target deconvolutional network is defined by a substantially fewer numerical parameters than the source deconvolutional network.

20 Claims, 6 Drawing Sheets

(51) Int. Cl.
*G06T 7/10* (2017.01)
*G06K 9/48* (2006.01)
*G06T 7/00* (2017.01)
*H04N 19/91* (2014.01)
*G06N 99/00* (2010.01)
*G05D 1/00* (2006.01)

(52) U.S. Cl.
CPC .............. *G06T 7/0087* (2013.01); *G06T 7/10* (2017.01); *H04N 19/91* (2014.11); *B60W 2710/18* (2013.01); *B60W 2710/20* (2013.01); *G05D 2201/0212* (2013.01); *G06T 2207/20004* (2013.01); *G06T 2207/20081* (2013.01); *G06T 2207/30252* (2013.01)

(56) References Cited

U.S. PATENT DOCUMENTS

| | | | | |
|---|---|---|---|---|
| 2001/0037178 | A1* | 11/2001 | Bush | G01V 1/30 702/14 |
| 2001/0049585 | A1* | 12/2001 | Gippert | C07K 1/00 702/19 |
| 2015/0006444 | A1* | 1/2015 | Tamatsu | G06N 3/082 706/12 |
| 2015/0127327 | A1* | 5/2015 | Bacchiani | G10L 25/30 704/202 |
| 2016/0328630 | A1* | 11/2016 | Han | G06K 9/6272 |
| 2017/0011738 | A1* | 1/2017 | Senior | G10L 15/063 |
| 2017/0017793 | A1* | 1/2017 | Davis | G06F 21/565 |

OTHER PUBLICATIONS

Papandreo et al. ("Weakly- and semi-supervised learning of a deep convolutional network for semantic image segmentation," IEEE International Conference on Computer Vision, Dec. 7-13, 2015, pp. 1742-1750).*
Cristian Bucilă, et al., "Model Compression" Research Track Poster, KDD'06, Aug. 20-23, 2006, pp. 535-541.
Sergey Ioffe, et al., "Batch Normalization: Accelerating Deep Network Training by Reducing Internal Covariate Shift" arXiv:1502.03167v3 [cs.LG], Mar. 2, 2015, 11 Pages.
Vijay Badrinarayanan, et al., "SegNet: A Deep Convolutional Encoder-Decoder Architecture for Image Segmentation" arXiv:1511.00561v2 [cs.Cv], Dec. 8, 2015, 14 Pages.
Clément Farabet, et al., "Learning Hierarchical Features for Scene Labeling" IEEE Transactions on Pattern Analysis and Machine Intelligence, vol. 35, No. 8, Aug. 2013, pp. 1915-1929.
Jonathan Long, et al., "Fully Convolutional Networks for Semantic Segmentation" IEEE Conference on Computer Vision and Pattern Recognition (CVPR), 2015, pp. 3431-3440.
Hyeonwoo Noh, et al., "Learning Deconvolution Network for Semantic Segmentation" 2015 IEEE International Conference on Computer Vision, 2015, pp. 1520-1528.
Olga Russakovsky, et al., "ImageNet Large Scale Visual Recognition Challenge" International Journal of Computer Vision, vol. 115, Apr. 11, 2015, pp. 211-252.
Bolei Zhou, et al., "Learning Deep Features for Scene Recognition using Places Database" Conference on Neural Information Processing Systems 2014, Advances in Neural Information Processing Systems 27, 2014, 9 Pages.
Gabriel J. Brostow, et al., "Semantic object classes in video: A high-definition ground truth database" Pattern Recognition Letters, vol. 30, 2009, pp. 88-97.
A. Geiger, et al., "Vision meets robotics: The KITTI dataset" the International Journal of Robotics Research, vol. 32, No. 11, 2013, 7 Pages.
Qiang Chen, et al., "Deep Domain Adaptation for Describing People Based on Fine-Grained Clothing Attributes" IEEE Conference on Computer Vision and Pattern Recognition, 2015, pp. 5315-5324.

Eric Tzeng, et al., "Simultaneous Deep Transfer Across Domains and Tasks" 2015 IEEE International Conference on Computer Vision, 2015, pp. 4088-4076.
Geoffrey Hinton, et al., "Distilling the Knowledge in a Neural Network" arXiv:1503.02531v1 [stat.ML], Mar. 9, 2015, 9 Pages.
Sunando Sengupta, et al., "Urban 3D Semantic Modelling Using Stereo Vision" 2013 IEEE International Conference on Robotics and Automation (ICRA), May 6-10, 2013, pp. 580-585.
Hanzhang Hu, et al., "Efficient 3-D Scene Analysis from Streaming Data" 2013 IEEE International Conference on Robotics and Automation (ICRA), May 6-10, 2013, pp. 2297-2304.
Pushmeet Kohli, et al., "Robust Higher Order Potentials for Enforcing Label Consistency" International Journal of Computer Vision, vol. 82, Jan. 24, 2009, pp. 302-324.
German Ros, et al., "Vision-based Offline-Online Perception Paradigm for Autonomous Driving" 2015 IEEE Winter Conference on Applications of Computer Vision, 2015, pp. 231-238.
Julien P. C. Valentin, et al., "Mesh Based Semantic Modelling for Indoor and Outdoor Scenes" 2013 IEEE Conference on Computer Vision and Pattern Recognition, 2013, pp. 2067-2074.
Ross Girshick, et al., "Rich feature hierarchies for accurate object detection and semantic segmentation" 2014 IEEE Conference on Computer Vision and Pattern Recognition, 2014, pp. 580-587.
Liang-Chieh Chen, et al "Learning Deep Structured Models" Proceedings of the $32^{nd}$ International Conference on Machine Learning, JMLR: W&CP vol. 37, 2015, 10 Pages.
Shuai Zheng, et al., "Conditional Random Fields as Recurrent Neural Networks" arXiv:1502.03240v2 [cs.Cv], Apr. 30, 2015, 16 Pages.
Jifeng Dai, et al., "BoxSup: Exploiting Bounding Boxes to Supervise Convolutional Networks for Semantic Segmentation" 2015 IEEE International Conference on Computer Vision, 2015, pp. 1635-1643.
George Papandreou, et al., "Weakly- and Semi-Supervised Learning of a Deep Convolutional Network for Semantic Image Segmentation" 2015 IEEE International Conference on Computer Vision, 2015, pp. 1742-1750.
Mark Everingham, et al., "The Pascal Visual Object Classes Challenge: a Retrospective" International Journal of Computer Vision, vol. 111, 2015, pp. 98-136.
Marius-Cordts, et al., "The Cityscapes Dataset" CVPR Workshop on the Future of Datasets in Vision, 2015, 4 Pages.
Kaiming He, et al., "Deep Residual Learning for Image Recognition" arXiv:1512.03385v1 [cs.Cv], Dec. 10, 2015, 12 Pages.
Cristian Buda, et al., "Model Compression" Research Track Poster, KDD'06, Aug. 20-23, 2006, pp. 535-541.
Anna Choromanska, et al., "The Loss Surfaces of Multilayer Networks" arXiv:1412.0233v3 [cs.Lg], Proceedings of the $18^{th}$ International Conference on Artificial Intelligence and Statistics (AISTATS), JMLR: W&CP, vol. 38, Jan. 21, 2015, 13 Pages.
Adriana Romero, et al., "FitNets: Hints for Thin Deep Nets" arXiv:1412.6550v4 [cs.Lg], Mar. 27, 2015, 13 Pages.
Song Han, et al., "Deep Compression: Compressing Deep Neural Networks With Pruning, Trained Quantization and Huffman Coding" arXiv:1510.00149v5 [cs.Cv], Feb. 15, 2016, 14 Pages.
Forrest N. Iandola, et Al., "SqueezeNet: AlexNet-level accuracy with 5Ux fewer parameters and <1MB model size" arXiv:1607 07360v2 [cs.Cv], Feb. 27, 2016, 5 Pages.
Gabriel J. Brostow, et al., "Segmentation and Recognition Using Structure from Motion Point Clouds" 10th European Conference on Computer Vision (ECCV), 2008, 14 Pages.
"CBCL StreetScenes Challenge Framework" CBCL StreetScenes Database, http://cbcl.mit.edu/software-datasets/streetscenes/, 2007, 2 Pages.
Andreas Ess, et al., "Robust Multiperson Tracking From a Mobile Platform" IEEE Transactions on Pattern Analysis and Machine Intelligence, vol. 31, No. 10, Oct. 2009, pp. 1831-1846.
Sebastian Houben, et al., "Detection of Traffic Signs in Real-World Images: The German Traffic Sign Detection Benchmark" IEEE, The 2013 International Joint Conference on Neural Networks (IJCNN), 2013, 8 Pages.

(56) References Cited

OTHER PUBLICATIONS

Abhijit Kundu, et al., "Joint Semantic Segmentation and 3D Reconstruction from Monocular Video" D. Fleet, et al., (Eds.): ECCV 2014, Part VI, LNCS 8694, 2014, pp. 703-718.
Carsten Rother, et al., "'GrabCut'—Interactive Foreground Extraction using Iterated Graph Cuts" ACM Transactions on Graphics, vol. 23, 2004, pp. 309-314.
Sergey Ioffe, et al., "Batch Normalization: Accelerating Deep Network Training by Reducing Internal Covariate Shift" arXiv:1502.03167v3 [cs.Lg], Mar. 2, 2015, 11 Pages.
Xavier Glorot, et al., "Deep Sparse Rectifier Neural Networks" Proceedings of the 14$^{th}$ International Conference on Artificial Intelligence and Statistics (AISTATS), JMLR: W&CP, vol. 15, 2011, pp. 315-323.
Ken Chatfield, et al., "Return of the Devil in the Details: Delving Deep into Convolutional Nets" arXiv:1405.3531v4 [cs.Cv)], Nov. 5, 2014, 11 Pages.
Karen Simonyan, et al., "Very Deep Convolutional Networks for Large-Scale Image Recognition" arXiv:1409.1556v6 [cs.Cv], Apr. 10, 2015, 14 Pages.
Kaiming He, et al., "Delving Deep into Rectifiers: Surpassing Human-Level Performance on ImageNet Classification" 2015 IEEE International Conference on Computer Vision, 2015, pp. 1026-1034.
Quoc V. Le, et al., "On Optimization Methods for Deep Learning" Proceedings of the 28$^{th}$ International Conference on Machine Learning, 2011, 8 Pages.
David Vazquez, et al., "Cool world: domain adaptation of virtual and real worlds for human detection using active learning" NIPS Domain Adaptation Workshop: Theory and Application, 2010, 4 Pages.
Alexey Dosovitskiy, et al., "FlowNet: Learning Optical Flow with Convolutional Networks" 2015 IEEE International Conference on Computer Vision, 2015, pp. 2758-2766.
Amir Roshan Zamir, et al., "Image Geo-Localization Based on Multiple Nearest Neighbor Feature Matching Using Generalized Graphs" IEEE Transactions on Pattern Analysis and Machine Intelligence, vol. 36, No. 8, Aug. 2014, pp. 1546-1558.
Bryan C. Russell, et al., "LabelMe: A Database and Web-Based Tool for Image Annotation" International Journal of Computer Vision, vol. 77, 2008, pp. 157-173.
Nathan Silberman, et al., "Indoor Segmentation and Support Inference from RGBD Images" A. Fitzgibbon, et al., (Eds.): ECCV 2012, Part V, LNCS 7576, 2012, pp. 746-760.
Joseph Tighe, et al., "SuperParsing: Scalable Nonparametric Image Parsing with Superpixels" K. Daniilidis, et al., (Eds.): ECCV 2010, Part V, LNCS 6315, 2010, pp. 352-365.
L'ubor Ladický, et al., "What, Where and How Many? Combining Object Detectors and CRFs" K. Daniilidis, et al., (Eds.): ECCV 2010, Part IV, LNCS 6314, 2010, pp. 424-437.
Jose M. Alvarez, et al., "Road Scene Segmentation From a Single Image" A. Fitzgibbon, et al., (Eds.): ECCV 2012, Part VII, LNCS 7578, 2012, pp. 376-389.
Lei Jimmy Ba, et al., "Do Deep Nets Really Need to be Deep?" arXiv:1312.6184 [cs.Lg], Submitted Dec. 21, 2013, Last Revised Oct. 11, 2014, 9 Pages.
Tsung-Yi Lin, et al., "Microsoft Coco: Common Objects in Context" D. Fleet, et al., (Eds.): ECCV 2014, Part V, LNCS 8603, 2014, pp. 740-755.

\* cited by examiner

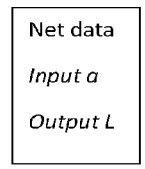
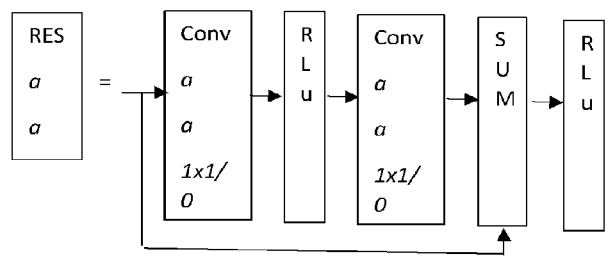
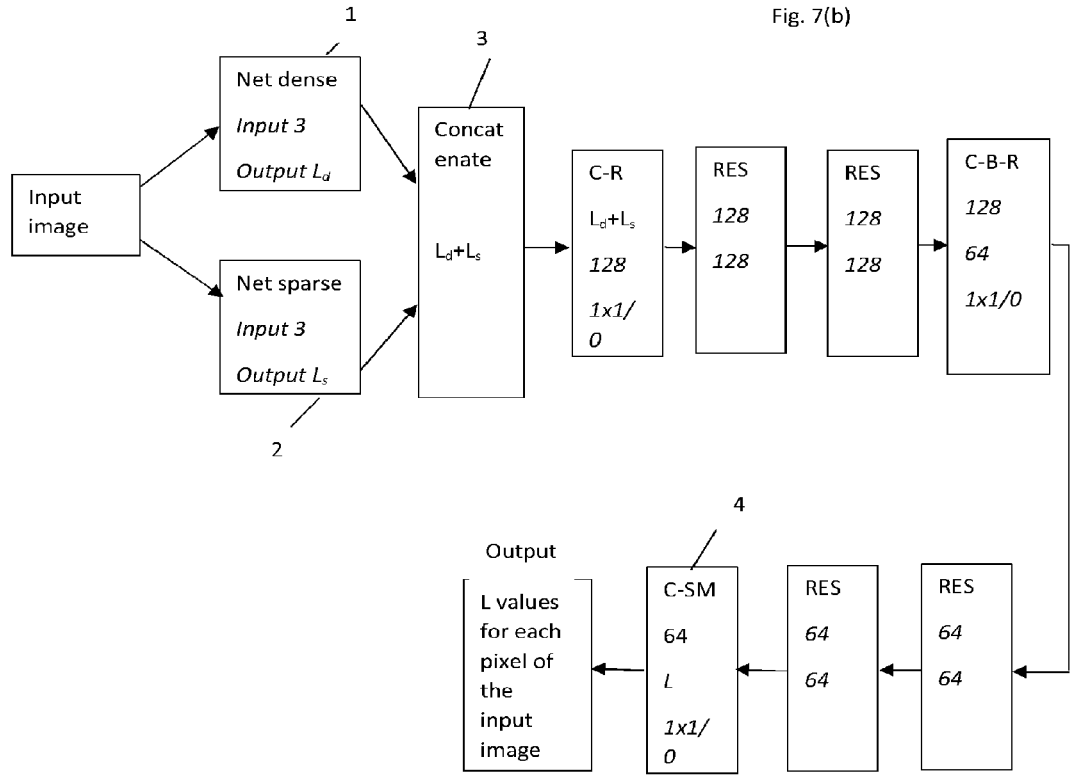
Fig. 7(a)
Fig. 7(b)
Fig. 8

TRAINING CONSTRAINED DECONVOLUTIONAL NETWORKS FOR ROAD SCENE SEMANTIC SEGMENTATION

FIELD OF THE INVENTION

The present disclosure relates to computer-implemented methods and computer systems for identifying, within images, areas of the image which are images of objects, and labelling the areas of the images with a label indicating the nature of the object.

BACKGROUND OF THE INVENTION

A convolutional neural network (CNN, or ConvNet) is a type of feed-forward artificial neural network which has been used for processing images.

One of the building blocks of a CNN is a "convolutional layer" which receives a two-dimensional array of values as an input. A convolutional layer comprises an integer number b of filters, defined by a respective set of numerical parameters. The input to a convolutional layer is a set of two-dimensional arrays of identical size; let us denote the number of these arrays as an integer a. Each filter is convolved with the input two-dimensional arrays simultaneously, to produce a respective two-dimensional output. During the convolution process, a given one of the filters successively receives input from successive corresponding windows (i.e. small areas) of each of the input two-dimensional arrays (the "visual field" of the filter). The size of the window may be denoted as k×k, where k is an integer; thus, the filter generates a single output value using k×k×a input values. The filter multiples these values by k×k×a respective filter values, and adds the results to give a corresponding output value. Thus, for a given filter, the corresponding small areas of each input two-dimensional image produce a single output value, which is one pixel of the respective two-dimensional output.

The successive visual fields for each filter are offset by a number of pixels called the "stride". A stride value of 1 will be assumed in this document which means that the size of the two-dimensional input arrays is substantially equal to the size of the two-dimensional output arrays.

Critical parameters of a given convolution layer thus include the number a of two-dimensional arrays it receives as an input, the number b of filters it contains (which is equal to the number of two-dimensional output arrays it produces), and the size of the k×k visual field of each filter in each of the input images. Often the input image is padded with zeros around its outer periphery, and the size of this zero-padding is another parameter.

FIG. 1 shows a notation used here to represent a convolutional layer. It denotes that the input to the convolutional layer is a set of a two-dimensional arrays, and the convolutional layer contains b filters. The size of the window is k×k, and the input array is padded by a value "pad".

A second common building block of the convolutional network is a pooling layer, which performs non-linear down-sampling. Specifically, the pooling layer partitions a two-dimensional array into non-overlapping blocks of size k×k and outputs for this block two output values: the maximum of the k×k input values for the block, and a "pooling index" indicating which of the k×k input values of the block had the highest value. In other words, pooling partitions the input image into a set of non-overlapping squares, and, for each such square, outputs the maximum. The fact that the blocks are non-overlapping is equivalent to saying that the blocks are spaced apart pairwise by a stride equal to the size of the blocks; in a generalisation, which is not considered further in this document, this may not be the case.

FIG. 2(a) shows a notation used here to represent a pooling layer, and FIG. 2(b) is an equivalent simplified notation. Both mean that the pooling layer uses blocks of size k×k, offset pairwise by a stride k.

Another common building block of a convolutional network is a Rectified Linear Unit (ReLU) layer. This transforms each value input to it (denoted x) according to the function $f(x)=\max(0,x)$. FIG. 3(a) shows a notation used here to represent a ReLU layer Another common building block of a convolutional network is a Batch normalisation (BNorm) layer. This operates on a set of input values, and uses two numerical parameters A and B. Each input values is reduced by the value A, and the then divided by parameter B, to produce a respective output value. The values of A and B are chosen such that the set of output values has a mean of zero, and a variance of 1. FIG. 3(b) shows a notation used here to represent a ReLu layer.

Another common building block of a convolutional network is a softmax layer. This operates on an integer number K of input values, and outputs a set of respective K output values in the range (0, 1) that add up to 1. FIG. 3(c) shows a notation used here to represent a softmax layer. The softmax layer is often positioned at the output of the convolutional network, and the output values of the softmax layer correspond to probability values. In one example, each of the outputs of the softmax layer corresponds to a respective object category, and when an image is input to the convolutional network, the values output by the softmax layer indicate respective probabilities that the image shows an object in the respective one of the object categories.

Recently "deconvolutional networks" (DN) have been proposed. A deconvolution network includes a mechanism to regress an output with non-trivial spatial context. One example is spatial resolution in 2D (H×W), but a deconvolution network is also applicable to inputs in more than 2D (H×W×D_3× . . . ×D_k). The outputs of the deconvolution network may have the same spatial resolution as the inputs, a larger spatial resolution or even a smaller resolution. An example of these architectures are those producing an output value for each of the input pixels of an image, i.e., for an input image of size H×W the output size is H×W, independently from the mechanism used for the regression of the spatial context. The term "deconvolutional network" is chosen to maintain coherence with prior work.

Commonly, a deconvolutional network includes also an "unpooling" layer followed by a "deconvolution" layer. An unpooling layer is the opposite of a pooling layer. The input to an unpooling layer is a two-dimensional array of numerical values, and for each value a respective "pooling index" indicating one pixel of a k×k array of pixels. For each of the two-dimensional array of numerical values, the unpooling layer outputs a respective k×k array of second numerical values. The second numerical values indicated by the respective pooling index is equal to the first numerical value, and the other k×k−1 second numerical values are zero. Thus, given an input which is a two-dimensional array of first numerical values of size b×b, the output is a kb×kb array of second numerical values, of which all but b×b second numerical values are zero.

In other words, the unpooling layer undoes the pooling layer: if a certain first 2-D array of first numerical values is signal is passed through a pooling layer, and then an unpooling layer, the result is a second 2-D array of the same size as the first 2-D array, with the highest of the first numerical values in each k×k block is unchanged, but all the other first numerical values set to zero.

The "deconvolution layer" then applies a convolution on the output. During this operation, the non-zero values output by the unpooling layer, generate non-zero values in positions in the 2-D array where the output of the unpooling layer was zero. Thus, a deconvolution is convolution transposed.

The combination of the unpooling layer and the deconvolution layer may be considered as the opposite of a pooling layer and convolution layer.

FIG. 4(a) shows a notation used here to represent a unpooling layer, and FIG. 4(b) is an equivalent simplified notation.

DNs have achieved notable success on the task of semantic segmentation, in which image recognition is performed at the resolution of individual pixels, and have consequently become an attractive architecture for road scene segmentation—a useful component in many autonomous driving or advanced driver assistance systems. However, several limitations exist when trying to apply state-of-the-art DNs in practice.

Firstly, they are inefficient in terms of memory footprint. While commercial chips targeting the automotive industry are becoming increasingly parallel, the small size of fast-access on-chip SRAM memories remains limited (e.g. 512 KB for the Mobileye EyeQ256 chip and 1-10 MB for the Toshiba TMPV 760 Series76 chip family). In contrast, the popular DNs use 50-1000 times more memory. Although more efficient DN architectures have been proposed, they still contain tens of millions of parameters and are yet to demonstrate accuracy on a par with the larger DNs.

Secondly, since DNs are typically trained in a supervised manner, their performance benefits from access to a large amount of training data with corresponding per-pixel annotations. Producing such annotations is an expensive and time-consuming process. Hence, while datasets for tasks such as image classification can reach $O(10^7)$ images in scale, popular semantic road scene segmentation datasets contain $O(10^3)$ images. The scarcity of data results in a lack of samples for rarer but important classes such as pedestrians and cyclists, which can make it difficult for networks to learn these concepts without overfitting. Furthermore, data scarcity implies poor coverage over the true distribution of possible road scenes: datasets are typically captured in one or a few localised regions under relatively homogeneous road conditions. Understanding how best to incorporate knowledge from new domains as training data becomes available is an important problem to ensure the best general task performance given available data.

We now briefly recapitulate the literature on the following topics: (i) semantic segmentation, and (ii) training with limited data.

(i) Semantic Segmentation.

The task of semantic segmentation involves the estimation of a function $f$ which maps an input image, such as $\mathcal{I} \in [0, \ldots, 255]^{H \times L}$, to an output label image $\mathcal{T} \in [1, \ldots, N]^{H \times L}$, where the labels $1, \ldots, N$ index the semantic class of the input at that pixel (e.g. road, sidewalk, sky, vegetation, pedestrians, etc.). This is a popular problem in computer vision and has been tackled for various environments from indoors to outdoors, as well as for specific tasks such as road scene perception. For the latter, which is the focus of our work, semantic segmentation is expected to play a key role as part of the local planning and obstacle avoidance subsystems of future semi-autonomous and autonomous vehicles.

Classical tools for addressing the problem include pipelines based on a combination of hand-crafted features (e.g. SIFT, HOG) and region-based classifiers (e.g. SVM, ADABoost), with probabilistic graphical models such as Conditional Random Fields (CRFs) used to produce structured predictions. With the arrival of deep convolutional neural networks (CNNs), hand-crafted features were substituted by learned CNN representations, which worked at the level of image patches. This trend continued with the introduction of DNs, which naturally perform the process of recognition and whole-image segmentation, producing a dense inference at a pixel level.

(ii) Training with Limited Data.

One key problem with DNs is that when applied to certain domains, such as automotive environments, there is a lack of suitably large and varied training data. Proposals exist to mitigate this problem by augmenting an existing semantic segmentation dataset (i.e. consisting of pixel-wise labels) with additional data from object detection and image classification datasets, which are weakly annotated with bounding boxes or text captions. Both approaches are directly applied on the augmented datasets to train DNs in an end-to-end fashion and have resulted in improvements in accuracy. However, obtaining significant improvements in this manner is possible only when the existing and additional datasets are similar in nature—such as annotations of simple objects.

(iii) Improving the Performance of Shallow Networks

The recent trend in deep learning has been to strive for even deeper models, but the preference for deep versus shallower models is not because shallower models have been shown to have limited capacity or representational power, but rather that learning and regularization procedures used to train shallow models are not sufficiently powerful. One reason for this is that, counterintuitively, the likelihood of falling into poor quality local minima increases with decreasing network size. Various approaches to extract better performance from shallow networks have been proposed in the literature. Some use an ensemble of classifiers, trained on a small but representative subset of a larger dataset, to label a larger unlabelled dataset. The large ensemble-labelled dataset is then used to train a network. In another approach, a large teacher ensemble was trained, and knowledge was transferred from it to a shallow but wide model by training it to match the logit activations of the teacher.

BRIEF DESCRIPTION OF THE DRAWINGS

An example of the invention will now be described for the sake of example only with reference to the following figures, in which:

FIG. 7 is composed of FIG. 7(a) which shows a notation used in this document, and FIG. 7(b) which shows another notation used in this document and its definition;

FIG. 8 shows the structure of a first deconvolutional network (S-Net) used in the example of the invention;

DETAILED DESCRIPTION

Figure 1:
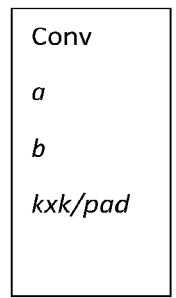
FIG. 1 shows a notation used in this document to denote a convolutional layer.
Figure 2A:
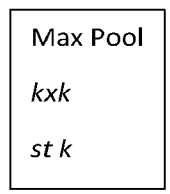
FIGS. 2(a) and 2(b) show two equivalent notations used in this document to denote a pooling layer.
Figure 2B:
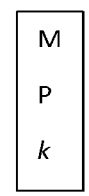
Figure 3A:
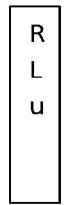
FIGS. 3(a), 3(b) and 3(c) respectively show notations used in this document to denote a Rectified Linear Unit layer, a batch normalisation layer and a softmax layer.
Figure 3B:
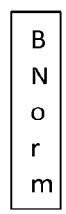
Figure 3C:
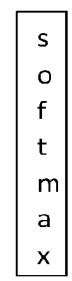
Figure 4A:
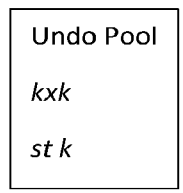
FIGS. 4(a) and 4(b) show two equivalent notations used in this document to denote an unpooling layer.
Figure 4B:
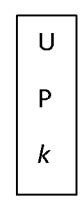
Figure 5A:
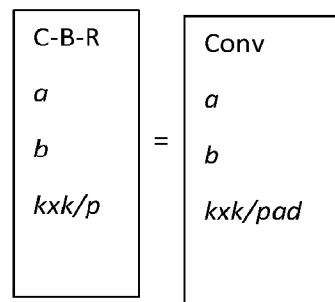
FIGS. 5(a) to 5(c) show further notations used in the explanation of the example of the invention.
Figure 5B:
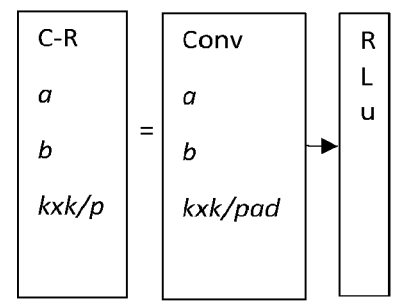
Figure 5C:
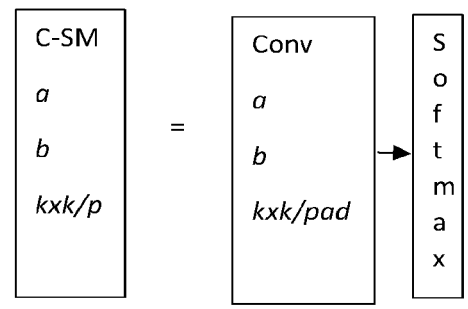

In general terms the invention proposes that a source deconvolutional network (here referred to also as S-Net) is adaptively trained to perform semantic segmentation. The training process uses training data comprising image data encoding training images and annotation data labelling corresponding areas of the training images. The areas are preferably individual pixels of the training images, although they might alternatively be "super-pixels" or other structures instead of individual pixels. The annotation data specifies one of a number of a predetermined set of object categories, and indicates that the corresponding area of the image is an image of an object which is in the object category specified by the annotation data.

The S-Net is trained substantially without constraints on its size (or at any rate, without being constrained by the memory limitations of current fast-access on-chip SRAM memories).

Training images are input to the S-Net (some or all of which may have been ones used to produce the S-Net), and one or more corresponding outputs of the S-Net are determined. These training images and the measured output(s) of the S-Net are then used to train a target deconvolutional network (also referred to here as T-Net). The T-Net is defined by a substantially fewer numerical parameters than the S-Net. That is, the training procedure for the T-Net involves adapting fewer numerical parameters than those adapted to produce the S-Net.

Specifically, the T-Net may be selected ("constrained") such that the number of parameters of the T-Net is no higher than a numerical limit, such that it is possible to implement the T-Net in an integrated circuit according to a current integrated circuit design, such as a current fast-access on-chip SRAM. For example, the T-Net preferably has no more than 10M adaptively-set numerical parameters, and more preferably fewer than 5M adaptively generated-set numerical parameters. The S-Net, by contrast, may be trained substantially without constraints on the training time and/or the memory requirements to store the numerical parameters which define it. The S-Net may contain more than 50 times (more preferably, more than 100 times, or even more than 200 times) as many adaptively-set numerical parameters as the T-Net.

The term "deconvolutional network" is used here to mean a computational model which comprises a plurality of layers arranged in a sequence, the layers successively transmitting data to a next one of the layers, and the layers including:

a plurality of convolutional layers, each convolutional layer performing a plurality of convolution operations defined by respective filters on one or more two-dimensional arrays of input values, to generate, for each filter a respective two-dimensional array of output values;

a plurality of pooling layers which each perform a down-sampling operation on a two-dimensional array of input values, to produce a smaller two-dimensional array of output values; and a plurality of unpooling layers which each perform an upsampling operation on a two-dimensional array of input values, to produce a larger two-dimensional array of output values.

Typically, the S-Net and the T-Net are generated automatically, by the method above, inside a computer apparatus such as a suitably programmed general purpose computer which acts as the training apparatus. The computer apparatus contains, or has access to, a tangible data storage device storing program instructions (in non-transitory form) operative to cause a processor of the computer apparatus, when running the program instructions, to carry out the steps of the method for generating the S-Net and T-Net.

Data describing the T-Net is then output from the computer apparatus, and used to implement the T-Net as one or more tangible integrated circuits. Specifically, the parameters of the T-Net are transferred from the computer apparatus to an ASIC (application specific integrated circuit) or a FPGA (field-programmable gate array) integrated circuit, implementing the SoC (system-on-chip) technology, where the same operations defined by the blocks of the T-Net are implemented (i.e. the integrated circuit is a clone of the T-Net, and includes corresponding functional blocks performing convolution, ReLu, pooling, unpooling, etc). The integrated circuit(s) may then be used as part of an on-vehicle system for semantic segmentation of images of road scenes, such as semantic segmentation component of a road vehicle control system. Outputs of the road vehicle control system are transmitted to control inputs of a steering system and a speed control system of the vehicle. Thus, the vehicle may operate as a "self-driving" road vehicle.

In the following example of the invention, numerous publicly available datasets from different domains and modalities are collated to form a dataset for the task of semantic road scene segmentation. We refer to our aggregated dataset as the Multi-Domain Road Scene Semantic Segmentation (MDRS3) dataset. We select two of the constituent datasets in their entirety as the test set for MDRS3. This means that training and testing for MDRS3 are not carried out on subsets of the same original dataset and performance is a better indication of task generalisation.

The S-Net (and optionally the T-Net) may be generated using training data including multiple portions which are different "domains" or "modalities". Specifically, a first of the domains may include training data in which the annotation data is accurate for each pixel. A second of the domains may include training data in which the annotation data is approximate, such as annotation data generated by an automatic algorithm and not available for each pixel but only for a few of them. The first sort of training data is called "dense" training data, whereas the second is called "sparse" training data, where "dense" means that the ratio of annotated pixels with respect to the total number of pixels is above a first threshold (e.g. 60% or even 70%), whereas sparse implies that the ratio of annoted pixels to with respect to the total number of pixels is below a second threshold (e.g. 20% or even 10%) lower than the first threshold.

The S-Net may include multiple deconvolutional networks which each receive the input to the S-Net and which were trained on training data with the different respective modalities. The S-Net may include one or more layers, optionally including one or more convolutional layers, to combine the outputs of the multiple deconvolutional networks.

We now explain a detailed example of the use of these principles.

1 Generation of Training and Test Datasets to be Used in the Example

Acquiring data suitable for training road scene semantic segmentation is expensive and time-consuming. The process of densely labelling an image with 10-20 classes can take up to 30 minutes for a typical, cluttered perspective street-view image and so existing datasets tend to be relatively small. In addition, datasets are often confined to localised geographic regions and trained and tested on in isolation. In the example, numerous datasets are used to create one aggregate dataset, which we refer to as the Multi-Domain Road Scene Semantic Segmentation dataset (MDRS3), to take advantage of all of the relevant training data available.

1.1 Dataset Composition

The datasets included popular road scene semantic segmentation datasets with dense pixel-wise annotations such as CamVid [1, 2] and KITTI Semantic (KITTI-S) [3, 4, 5].

As shown in Table 1, these dense datasets contain a large imbalance in the frequency of occurrence of various classes: structural classes such as road, sky or building are several orders of magnitude more frequent than important non-structural classes such as cars, pedestrians, road-signs or cyclists. To boost the recognition of the latter, we include specific detection and recognition datasets where annotations are available in the form of bounding-boxes or segmentation masks: KITTI Objects (KITTI-O) [3], a filtered set of Microsoft COCO (M-COCO) [6] containing pedestrians, cyclists, road signs and cars in urban environments, ETH Robust Multi-Person Tracking from Mobile Platforms (ETH-RMPTMP) [7] for pedestrians and the German Traffic Sign Recognition Benchmark (GTSRB) [8] for road signs.

The distribution of classes for our MDRS3 train and test sets (final two rows of Table 1) illustrate how training data in our dataset includes many more instances of important rare classes compared to existing dense datasets.

1.3 Test Dataset

For evaluation, a separation was maintained between the datasets used for training and testing. A combination of different domains was used with dense and sparse annotations for training, while the testing used two separate datasets with dense pixel-wise annotations: a new subset of the LabelMe dataset with urban images from different cities, referred here to as Urban LabelMe (U-LabelMe) and a processed subset of the CBCL StreetScenes Challenge Framework. These two datasets are more challenging compared to CamVid and KITTI, containing a larger variety of scenarios with different viewpoint and illumination conditions (compared to the forward-looking camera viewpoint in CamVid and KITTI). The test dataset thus provides a better measure of the generalisation performance of the trained network at test time, especially compared to the common practice of using subsets of the same sequence for training and testing.

2. Network Architectures for Semantic Segmentation

We consider a known DN architecture and the trade-off it achieves between task performance and memory footprint. The selected state-of-the-art network is the fully convolutional network (FCN) [11]. We do not consider models that are extended with a CRF, since such extensions do not alter the intrinsic model capacity and smoothing can be added as a post-processing step if desired.

Figure 6:
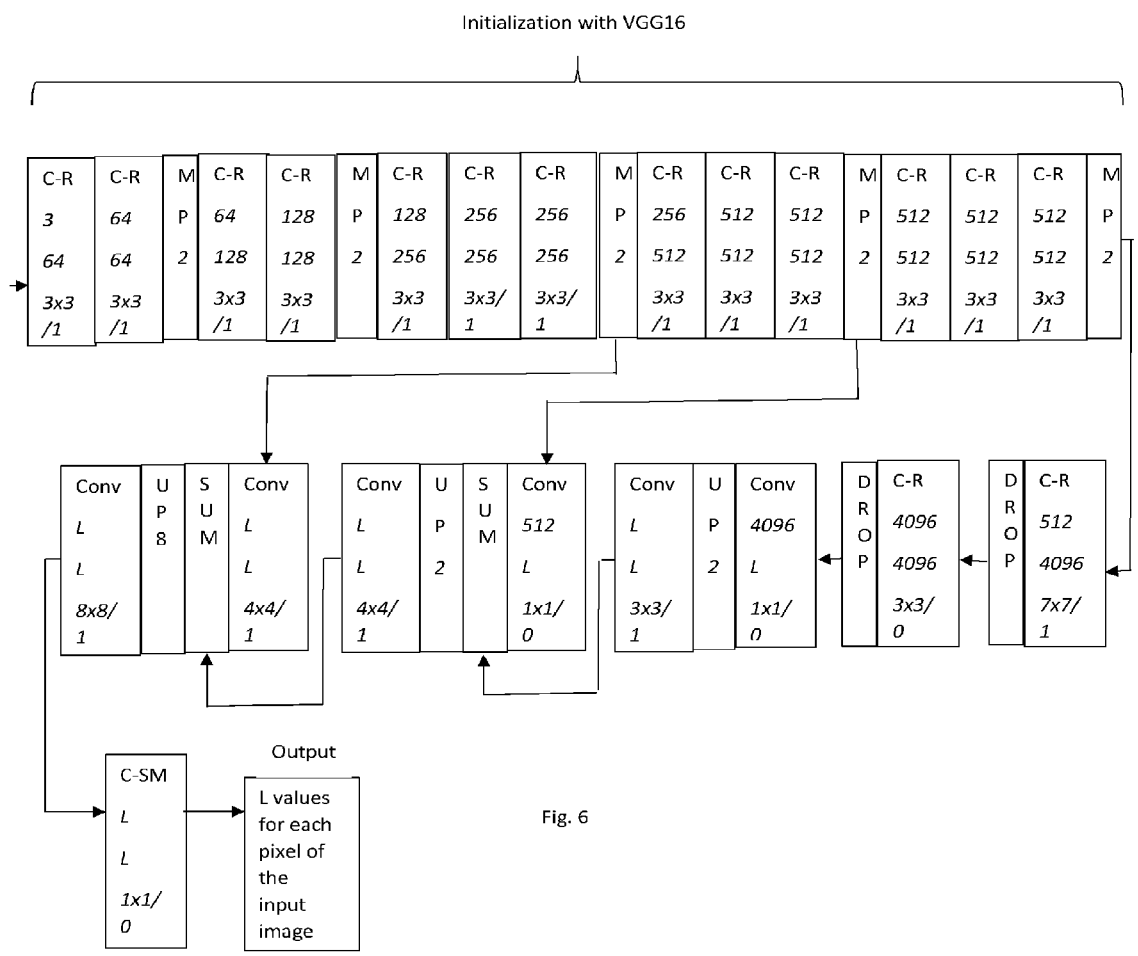
FIG. 6 shows a fully convolutional network (FCN) used in the example of the invention.

The FCN architecture is shown in FIG. 6. The three arrays are the intensities of respective colours red-green-blue (and hence in FIG. 6, the first convolutional layer as having an input defined by "3" two-dimensional arrays).

The layer marked "drop" refers to a unit which randomly switches off a proportion of the neural activations during the training (a different set of activations for each batch of images). This has the advantage of reducing or avoiding model overfitting.

TABLE 1

Class distribution (% of total pixels) for the MDRS3 dataset constituents and test/train splits. The "void" class has been removed for clarity.

| Dataset | No of images | Sky | Building | Road | Sidewalk | Fence | Vegetation | Pole | Car | Sign | Pedestrian | Cyclist |
|---|---|---|---|---|---|---|---|---|---|---|---|---|
| CamVid | 600 | 15.7 | 24.4 | 33.4 | 6.2 | 2.6 | 11.4 | 0.4 | 4.8 | 0.5 | 0.4 | 0.5 |
| KITTI-S | 547 | 6.2 | 25.9 | 17.2 | 7.0 | 3.7 | 28.7 | 0.5 | 9.9 | 0.4 | 0.2 | 0.2 |
| *U-LabelMe | 942 | 13.2 | 39.9 | 19.1 | 8.1 | 0.3 | 11.1 | 0.5 | 5.8 | 0.3 | 1.1 | 0.5 |
| *CBCL | 3547 | 5.4 | 26.4 | 28.2 | 6.9 | 0.7 | 17.9 | 1.3 | 11.8 | 0.3 | 0.8 | 0.2 |
| *ETH-RMPTMP | 14056 | — | — | — | — | — | — | — | — | — | 100 | — |
| *GTSRB | 740 | — | — | — | — | — | — | — | — | 100 | — | — |
| M-COCO | 3,262 | — | — | — | — | — | — | 1.0 | 63.7 | 11.4 | 16.6 | 7.3 |
| *KITTI-O | 7,481 | — | — | — | — | — | — | — | 90.7 | — | 7.4 | 1.9 |
| MDRS3-Train | 26,686 | 5.4 | 12.1 | 12.5 | 3.1 | 9,.2 | 9.2 | 0.5 | 36.6 | 3.4 | 13.2 | 2.5 |
| MDRS3-Test | 4,489 | 10.0 | 34.4 | 22.8 | 7.6 | 14.0 | 14.0 | 0.8 | 8.3 | 1.0 | 1.0 | 0.3 |

1.2 Refinement of Sparse Annotations.

For constituent datasets where annotations are provided in the form of bounding-boxes (marked with an asterisk in Table 1), refinement to pixel-wise annotations was performed by adopting a similar GrabCut-based approach of [9]. For the CBCL dataset, which is labelled with polygonal bounding-boxes for 9 object categories and contains many void areas, the category set was enlarged to 11 and existing labels were extended to missing areas using a CRF classifier [10].

Note that the parameter L is the number of object categories which the FCM is trained to recognise. The output of the FCN is L two-dimensional arrays (each being of the same size as the image input to the FCN), where for each pixel the L values represent numerical values indicative of how likely it is that the pixel is imaging an object in the corresponding one of the L categories.

FIG. 7(a) shows a symbol used later in this document to denote a FCN trained with a dataset denoted by [dataset]. The FCN is for classifying the pixels into L object categories.

FIG. 7(b) shows another symbol used later in this document, and its definition. This is block is called here a RES block.

The upper row of the FCN architecture is the VGG-16 architecture of [12] and is initialized in the same way, without batch normalisation. The depth of the FCN network is justified for the task of semantic segmentation of general scenes (which contain thousands of classes of objects), but shallower networks may suffice for constrained urban environments. Note that the FCN combines outputs of different layers to achieve better localization accuracy.

2.1 Source Network (S-Net) Architecture

The Source Network (S-Net) is selected by choosing the best possible performing network, disregarding memory or computational constraints. The choice of S-Net is explained in Section 3 below, and as described there the result is the network illustrated in FIG. 8. The input to the S-Net is an image consisting of three two-dimensional arrays of input values.

The S-Net comprises of an ensemble of two FCN networks 1, 2 trained respectively with different data modalities, i.e. dense and sparse data modality respectively. Pixels of the dataset with dense data modality are associated with one of $L_d$ labels, so FCN 1 generates an output which is $L_d$ two-dimensional arrays. Pixels of the dataset with sparse data modality are associated with one of $L_s$ labels, so FCN 1 generates an output which is $L_s$ two-dimensional arrays. Each of the two-dimensional arrays output by the FCNs 1, 2 are the same size as the original image. In our experiments $L_d$ is set to 11 and $L_s$ is set to 6.

The outputs of the FCNs are concatenated by a unit 3. This produces $L_d+L_s$ two-dimensional arrays of identical size.

The S-Net is trained to perform semantic segmentation with L categories. The unit 4 is trained to generate for each pixel L values indicative of the respective likelihoods the object imaged at that pixel belongs to the respective L categories.

In total the S-Net has 269M parameters, including those of the FCNs 1, 2.

2.2 Target Network (T-Net) Architecture

Figure 9:
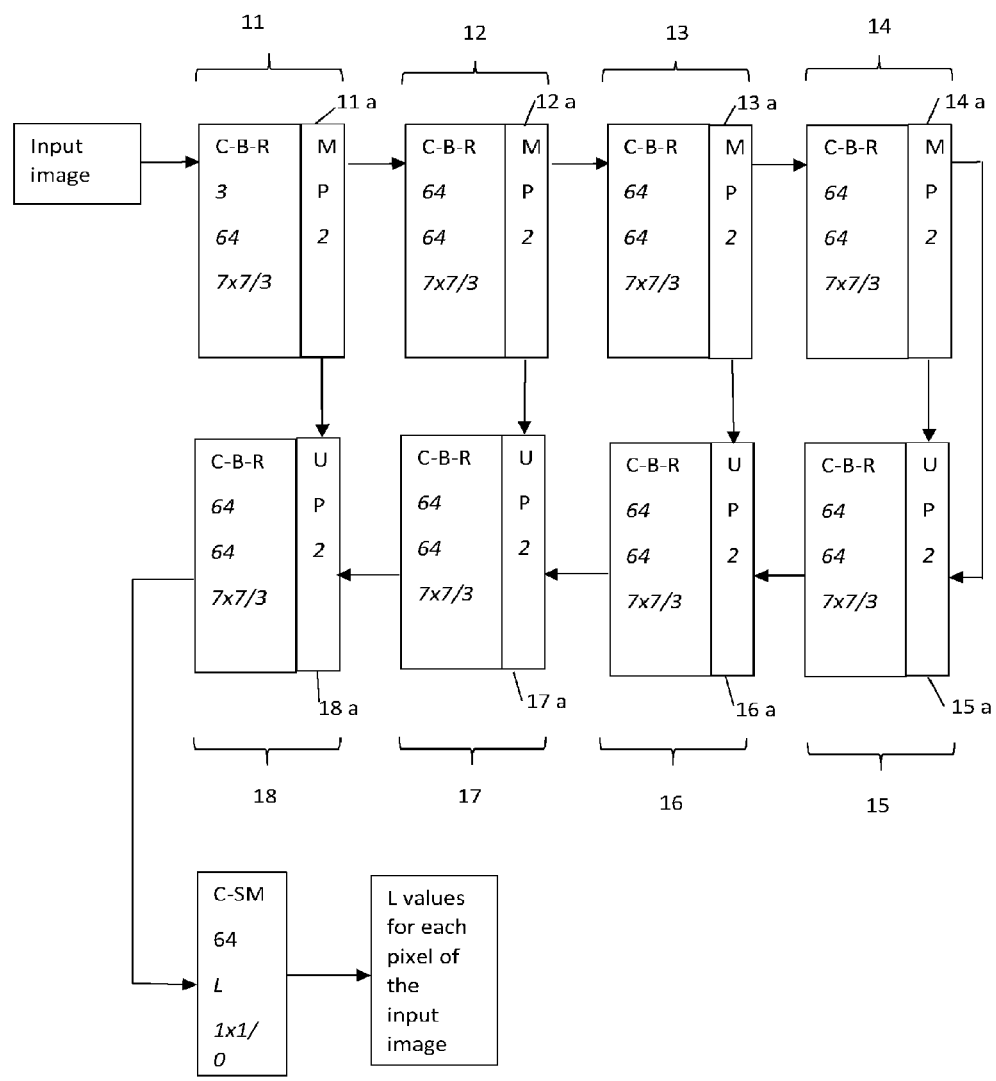
FIG. 9 shows the structure of a second deconvolutional network (T-Net) used in the example of the invention.

The T-Net is shown in FIG. 9. The T-Net consists of 4 contraction blocks 11, 12, 13, 14, followed by 4 expansion blocks 15, 16, 17, 18, with a total of 1.4 M parameters (in other words just under 0.5% of the parameters of the S-Net). Tins reduced size offers a good compromise between memory requirement and performance. Contraction blocks (comprising a convolution layer (with batch renormalisation and ReLu) followed by a pooling layer) serve to create a rich representation that allows for recognition as in standard classification CNNs. Expansion blocks (comprising an unpooling layer followed by a deconvolution layer (also with batch renormalisation and ReLu)) are used to improve the localization and delineation of label assignments. The convolution layers of both contraction and expansion blocks use 7×7 kernels with a stride of 1 pixel and a fixed number of 64 feature maps. Batch normalization is added prior to ReLU to reduce internal covariate shift during training and improve convergence. Upsampling in the expansion blocks 15, 16, 17, 18 is carried out by storing and retrieving pooling indices for current activations. Specifically, the pooling units 11a, 12a, 13a, 14a of the contraction blocks respectively pass the pooling indices to the unpooling units 18a, 17a, 16,a, 15a. This helps to produce sharp edges in the final output, avoiding blocky results. A linear classifier performs the final label estimation at the pixel level. The choice of 4 expansion/contraction blocks is motivated by empirical analysis, offering the best trade-off between model compactness and good performance.

All convolution layers in FIGS. 6, 8 and 9 use stride 1, although it is possible for variants of the invention to use a different stride for some units.

3. Selection of the S-Net and Training Strategies for Both DN Architectures

In this section we describe the different approaches used to select the S-Net, and to train the S-Net and T-Net on the challenging MDRS3 dataset described above.

The approaches explored to select the S-Net are (i) Training the FCN of FIG. 6 using "e2e"—standard end-to-end training over various subsets of the multi-domain training data; (ii) Training the FCN of FIG. 6 using "BGC"— which uses Balanced Gradient Contribution to generate stable gradient directions for end-to-end training; (iii) Training the FCN of "Flying-Cars"—dynamic domain adaptation of the sparse training data; and (iv) An "Ensemble" network, which uses an ensembling of FVN models trained on separate domains, as shown in FIG. 8.

For comparison, we also considered how the T-Net would perform given the training techniques (i)-(iv). Note that in technique (iv), this means that the network which is trained is that shown in FIG. 8 but with a respective T-Net as each of the networks 1, 2 (instead of the FCNs which are used in the S-Net). In other words, this technique results in a network with many more numerical parameters than techniques (i)-(iii).

Each training strategy was initialised identically. Contraction blocks of the S-Net and T-Net were assigned the weights of classification networks pre-trained on ImageNet—VGG-16 [12] in the case of FCN (as noted above), and VGG-F [13] in the case of T-Net. Adjustments to the shape of the weights were performed where dimensions do not match. The expansion blocks were initialized using the method of He et al. [14].

Optimisation was performed via standard backpropagation using Stochastic Conjugate Gradient Descent (S-CGD), endowed with a bounded line-search strategy and backtracking with Armijo's rule [15]. To avoid overfitting, the number of line-search iterations was bounded to 3. This proved to converge faster to good solutions than stochastic gradient descent without manual tweaking of learning rates.

3.1 End-to-End Training (e2e)

The simplest training approach used in the experiments, end-to-end (e2e) training, consisted of standard mini-batch training on random samples (with replacement) from the mixed dense and sparse training set (i.e. all data in).

Standard back-propagation is used for the training: using a loss function characterizing the difference between the output of the network and the desired output, there is a back-propagation of the errors through the network, and then an update of the weights according to a delta which is a product of the learning rate and the back-propagated gradient.

To achieve reasonable per-class accuracy, weighted cross-entropy (WCE) was employed in the definition of the loss function. WCE re-scales the importance of each class, l∈[1, . . . , L], according to its inverse frequency $f^l(\chi)^{-1}$ in the training data set $\chi$, i.e.:

$$\text{Loss}_{WCE}(x^n, y^n) = \Sigma_{ijl}^{HWL} \omega(y_{ijl}^n) y_{ijl}^n \log \mathcal{F}(x^n, \theta)_{ijl} \qquad (1)$$

where $x^n$ stands for the n-th training image, $y^n$ stands for the corresponding n-th ground truth image (i.e. $y_{ijl}$ equal to zero for one value of 1 and zero for all the others), $\mathcal{F}$ refers to the function performed by the network (i.e. the first input to function $\mathcal{F}$ is an image with H×W×C components (where C is the number of colours), θ represents all the parameters of the network (i.e. it is a stack of all the weights of the network), and the function $\mathcal{F}$ outputs a tensor with H×W×L components), and the weighting function is given by $$\omega(y_{ijl}^n) = \max\left\{\frac{f^l(\chi)^{-1}}{\sum_{i=1}^{L} f^i(\chi)^{-1}\min\{f^1(\chi)^{-1},\ldots f^L(\chi)^{-1}\}}, \epsilon\right\} \text{ for } \epsilon = 10^{-5} \quad (2)$$

$\epsilon$ is chosen arbitrarily and could be any small number. It is present to ensure that all pixels make some contribution to ω.

In this way, WCE helped the networks to account for class frequency imbalances, a common phenomenon exposed in Table 1, which were otherwise observed to reduce a network's attention to rare but important classes such as pedestrians or bicycles during training.

End-to-end training was applied to learn separate models for the dense and sparse domains as well as a combined model on both data domains. However, when this approach is used naively on the combined data, we observed an unstable oscillatory behaviour of the objective and eventually divergence of the system. This phenomenon is due to the strong difference between the statistics of both distributions, which give rise to very noisy descent directions during optimisation. Thus, in order to exploit all the information available in both domains it is preferable to stabilize the training process, via alternatives such as those proposed in the following sections.

3.2 Balanced Gradient Contribution (BGC)

The severe statistical difference between the domains induces a large variance in gradients for a sequence of mini-batches. Data from the dense domain is more stable and suitable for structural classes, but less informative in general. Data from the sparse domain is highly informative, with critical information about dynamic classes, but very noisy. To deal with these aspects search directions were computed using the directions proposed by the dense domain under a controlled perturbation given by the sparse domain as shown in (3).

$$\text{Loss}_{BGC}(x,y) = \text{Loss}_{WCE}(x^D, y^D) + \lambda \text{Loss}_{WCE}(x^S, y^S) \quad (3)$$

where x, y stand for a subset of samples and their associated labels, drawn from the dense (D) or sparse (S) domains. Here $\text{Loss}_{WCE}(x^D, y^D)$ and $\text{Loss}_{WCE}(x^S, y^S)$ are each sums of the $\text{Loss}_{WCE}$ given by Eqn. (1) over the corresponding subset of samples. Lambda is chosen empirically after several tests using a validation set.

This procedure can be seen as the addition of a very informative regularizer controlled by the parameter λ, but an analogous effect can be achieved by generating mini-batches containing a carefully chosen proportion of images from each domain, such that $|x^D| \gg |x^S|$, where $|x^D|$ and $|x^S|$ denote the number of elements of $x^D$ and $x^S$. This modification of the training procedure leads to superior results and a stable behaviour.

3.3 Flying Cars (FC): Domain Adaptation by Data Projection

Another alternative to solve the problem caused by the combination of incompatible domains is to project or transfer one domain into another. In our case, the noisy sparse domain is projected to the dense domain, using ideas from domain adaptation. This can be achieved, for instance, by selecting random images from the dense domain and using them as backgrounds in which to inject the objects and labels of the sparse domain. This approach can be seen as a way of performing highly informative data augmentation over the dense domain. We use a naive approach which does not provide a hard constraint on the spatial context of the objects being inserted into the scene, hence the name "Flying Cars" (FC).

3.4 Ensemble of Sparse and Dense Domains

Finally, it is possible to think about the domains as two different tasks: one consisting of recognizing $L_D=11$ classes from finely-annotated data; and the other of recognizing $L_S=6$ classes, i.e. foreground, traffic signs, poles, cars, pedestrians and cyclists, from noisy sparse annotations. The model trained on the dense domain, $\theta_D$, is better at structural elements such as roads, buildings and sidewalks; while the model trained on the sparse domain, $\theta_S$, is extremely good at segmenting dynamic objects such as pedestrians and cyclists. These models can be combined as part of a larger network which adds several new trainable blocks to perform a consensus from the output of the original models. In our experiments the ensemble is performed by fixing the original networks and adding a convolutional block and four residual-blocks as shown in FIG. 8 to estimate a consistent output. Residual-blocks were used as they were found to lead to better generalization than simple convolutions in practice.

Section 5 below shows experimental results of the training methods described in this section. As shown in Table 2, all four candidates to be the S-Net are observed to consistently outperform the smaller T-Net. Of these four candidates, the ensemble of FIG. 8, having 4 RES blocks, two with 128 features and two with 64 features, was the best configuration we found that did not lead to clear overfitting. This was accordingly adopted as the S-Net for training the T-Net 4 Transferring Knowledge Across Deconvolutional Networks Despite the high accuracy of the S-Net, its large number of parameters makes it unsuitable for embedded applications, in the context of road scene segmentation. It was investigated whether it is possible to boost a more compact model such as T-Net to have an equivalent performance. This is based hypothesis is that the capacity of T-Net is sufficient to produce results at the level of the S-Net, but due to specific details of its training and architecture, such as batch normalization and noise within the training data, the methods of section 3 cannot exploit its full potential. An attempt was therefore made to emulate the behaviour of the S-Net with (i.e. transfer its knowledge to) the T-Net. We describe three approaches to transfer knowledge: (i) via labels (TK-L), (ii) via soft-max probabilities (TK-SMP), and (iii) via soft-max probabilities with weighted-cross-entropy (TK-SMP-WCE). Note that the "drop" layers of the S-Net are turned off during the knowledge transfer process (i.e. there is no process of randomly setting neural activations of the S-Net to zero; the "drop" layers of the S-Net output their inputs without modifying them). The results are shown in Table 3.

4.1 Transferring Knowledge Through Labels (TK-L).

This strategy aims to distill the knowledge of the S-Net directly from its predicted labels. Both the dense and sparse domains of training data described in section 1 were used, ignoring their original annotations. The benefit of this approach is that the multi-modality of the data has been filtered by the S-Net and some distractors are ignored, so the information reaching the T-Net is simpler, leading to a smoother search space and making it easier to find good solutions. In our setup we included extra training data (i.e.

a new domain of training images) from a large unlabelled Google Street View (GSV) dataset [16], taken of street scenes from multiple cities in the US. We remove the upward facing camera and took a random crop from each image to produce 51,715 images. We combined previous and new training data using BGC to train the T-Net with a standard cross-entropy loss. Again, the training is done using successive batches of images, with each batch including training images from the spare domain, the dense domain and the new domain. Eqn. (1) remains valid, but $y_{ijl}$ is no longer 0 or 1, but a value in the range [0,1], representing a probability distribution for a given pixel (i, j) over the l possibilities. For a given pixel the values $y_{ijl}$ still sum up to one. Here, BGC is used as an important mechanism to control the influence of the GSV data and prevent drift.

4.2 Transferring Knowledge Through SoftMax Probabilities (TK-SMP).

The strategy uses additional information from S-Net during transfer, by considering the probability distributions produced by the softmax classifier, which contains information about how different classes are correlated. To this end, we train a T-Net using standard cross-entropy between the probability distributions of S-Net and T-Net as our loss function. As in the previous strategy, the training makes use of BGC to control the influence of GSV data to bound its contribution. This second approach leads to a notable improvement of the network per-class accuracy as shown in Table 3.

A variation of this method consists of adding drop-out blocks to the T-Net during the transference process. In practice, this addition behaves as in end-to-end training, helping to improve the generalization of the net. See Table 3 ("TK-SMP-Drop")

4.3 Transferring Knowledge Through SoftMax Probabilities with WCE (TK-SMP-WCE).

One of the problems with the previous approaches of TK-L and TK-SMP is that they do not account for class imbalance during transfer. In practice this means that the resulting models are biased towards the dominant classes and producing models with higher per-class accuracy requires a higher number of epochs during training. We propose to solve this problem by controlling the influence of each softmax sample with WCE by using a loss function in the form of Eqn. (1) where $y_{ijl}^n$ is replaced by the output of the S-Net when the batch of training images are presented, in the same way that the influence of different datasets is controlled by BGC. This modification, in combination with the use of dropout in the T-Net, leads to models that have virtually the same per-class accuracy as the S-Net, i.e. an ensemble of FCNs; see Table 3 (TK-SMP-WCE). In this way the full potential of the T-Net is unlocked, giving rise to an accurate and memory-efficient model, convenient for embedded systems and automotive applications.

5 Experimental Results

We evaluate the performance of the proposed training methodology with respect to a set of state-of-the-art baselines. Special emphasis is set on the performance of our TK-SMP-WCE transfer technique when used in combination with Balanced Gradient Contributions (BGC).

All our experiments are carried out on the MDRS3 dataset (Section 1), testing on the combination of U-LabelMe and CBCL (1,526 images overall). Due to time and resource constraints, we subsample the original images to a resolution of 240×180 in all our experiments. This speeds up training and evaluation of models but makes certain classes, such as sidewalks, poles and traffic signs, systematically harder to recognize for all models due to the low resolution. Nevertheless, this factor is consistent across all the experiments and does not affect the conclusions obtained when comparing different training approaches and models. Images are initially normalized using spatial contrast normalization, independently applied to each channel. Afterwards, zero-mean and data re-scaling in the range [−127,127] are applied. In practice we observed that this normalization speeds-up convergence.

Table 2 shows the results of the experiments of training the FCNs, the S-Net and the T-Net to perform semantic segmentation, while Table 3 shows the result of training the T-Net by knowledge transfer. The results are evaluated according to the average per-class accuracy (the column of tables 2 and 3 as "per-class") and the global accuracy (the column marked "global"). Given the number of pixels, $n_{i,j}$, belonging to class i and classified as class j, and assuming L is the number of classes, then "per-class" is evaluated as $$\frac{1}{L}\Sigma_i n_{i,j}/\Sigma_{j=1}^L n_{i,j}$$

and "global" as $\Sigma_i n_{i,i}/N$ where N is the total number of pixels in the evaluation set. Due to the intrinsic unbalanced nature of the class frequencies in urban scenes, we consider the average per-class to be more significant to assess the recognition and generalisation capabilities of the models. The difference between the results of the current method and the FCN model are shown in brackets.

TABLE 2

Semantic segmentation quantitative results for FCN, S-Net and T-Net on the testing dataset for the training methods understudy, i.e. end-to-end (dense, D; sparse, S; and both, D + S). BGC, Flying cars (FC) and net ensemble (Ens.).

| Method | Sky | Building | Road | Sidewalk | Fence | Vegetation | Pole | Car | Sign | Pedestrian | Cyclist | Per Class | Global |
|---|---|---|---|---|---|---|---|---|---|---|---|---|---|
| FCN (D) | 77.8 | 67.6 | 86.1 | 35.9 | 35.1 | 89.6 | 8.9 | 86.2 | 41.3 | 17.6 | 10.6 | 50.6 | 71.6 |
| T-Net (D) | 80.6 | 62.0 | 85.2 | 20.6 | 4.4 | 84.5 | 9.4 | 70.0 | 6.4 | 7.6 | 2.3 | 39.4 (−11.2) | 66.6 (−5.0) |
| FCN e2e (D + S) | | | | | | Did not converge | | | | | | | |
| FCN FC | 85.3 | 71.4 | 87.0 | 26.4 | 19.8 | 86.5 | 10.6 | 89.3 | 45.4 | 68.8 | 7.0 | 53.4 (2.8) | 73.2 (1.6) |
| FCN BGC | 80.3 | 73.5 | 82.6 | 49.5 | 39.6 | 91.6 | 11.6 | 87.3 | 50.8 | 44.1 | 19.6 | 57.3 (6.7) | 75.5 (3.9) |
| FCN ens (S-Net) | 77.4 | 71.9 | 85.0 | 27.8 | 40.8 | 85.8 | 8.0 | 93.4 | 43.0 | 80.4 | 60.6 | 61.3 (10.7) | 73.4 (1.8) |

TABLE 2-continued

Semantic segmentation quantitative results for FCN, S-Net and T-Net on the testing dataset
for the training methods understudy, i.e. end-to-end (dense, D; sparse, S; and both, D + S). BGC,
Flying cars (FC) and net ensemble (Ens.).

| Method | Sky | Building | Road | Side-walk | Fence | Vegetation | Pole | Car | Sign | Pedestrian | Cyclist | Per Class | Global |
|---|---|---|---|---|---|---|---|---|---|---|---|---|---|
| T-Net e2e (D + S) | | | | | | Training diverged | | | | | | | |
| T-Net FC | 77.5 | 67.2 | 77.7 | 33.4 | 18.4 | 86.3 | 8.0 | 80.0 | 18.8 | 25.9 | 4.8 | 45.3 (−5.3) | 69.1 (−2.5) |
| T-Net BGC | 58.9 | 64.5 | 81.6 | 21.5 | 4.8 | 83.1 | 11.0 | 82.3 | 21.2 | 31.3 | 9.3 | 42.7 (−8.3) | 64.9 (−6.7) |
| T-Net ens | 89.0 | 57.4 | 85.5 | 22.9 | 0.3 | 92.2 | 11.4 | 86.3 | 14.6 | 56.6 | 16.9 | 46.9 (−3.7) | 65.5 (−6.1) |

5.1 Assessing Multi-Domain Training

End-to-End training. Rows two and three rows of Table 2 show models trained using the dense domain only, with the end-to-end approach described in section 3.1. For this initial setup T-Net underperforms FCN by 11.2 points per-class.

We extended this first evaluation by adding the sparse domain to the end-to-end training. However, as shown in rows 4 and 8 of Table 2, the training diverged in both cases. This phenomenon was commented on in section 3.1 and is attributed to the gradient noise introduced by the sparse domain when its contribution is unbounded. This reinforces our claim that control over the distribution and the complexity of the data is required to produce competitive training results.

Flying Cars, BGC & Ensemble. When the end-to-end training is replaced by methods implementing policies to control the contribution of each domain, the improvement in accuracy is notable. Table 2, rows 5 to 7, show that for all the techniques, controlled training improves the per-class of the standard FCN. FC and BGC methods, although not achieving the top performance, have the advantage of requiring just one training stage; while the ensemble requires training individual models first (per domain) and then merging them. The outcome of applying FC, BGC and ensemble on the T-Net are analogous to the previous case; and again, the ensemble renders the best results in terms of per-class accuracy (see Table 2, rows 9 to 11).

performance. A simple transfer of labels (TK-L) from the S-Net produces a T-Net model that is already 2.9 points better than FCN (used here as a reference). When the transfer is based on the softmax probability distribution over the classes, as in TK-SMP, accuracy is boosted up to 57.3 (6.7 points better than FCN). It is worth noticing than, when dropout is included in the TK-SMP transference (TK-SMP-Drop), it improves global accuracy in 3.2 points compared to FCN. We observed this effect when using dropout at expense of some loss in per-class accuracy.

Finally, Table 3, row 6, shows that when the S-Net softmax distributions are weighted according to their relevance in the dataset (i.e. less abundant more relevant), the transference of this knowledge reaches the maximum performance found so far, 59.3% of per-class accuracy. Thus, the TK-SMP-WCE approach produces a T-Net 9.1 points better than FCN in per-class and 0.2 in global accuracy, almost reaching the results of the S-Net, i.e. an ensemble of two FCN which has 200 times more parameters.

Figure 10:
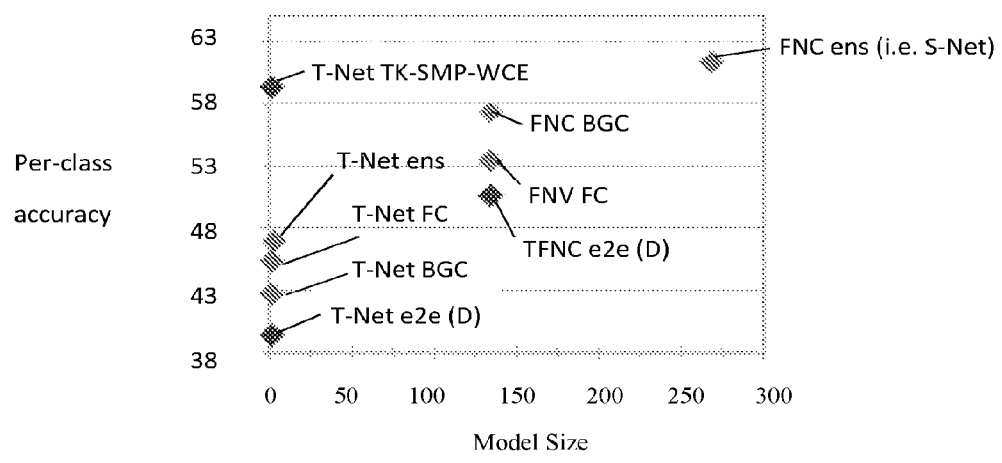
FIG. 10 shows experimental results.

FIG. 10 presents these results in another form, showing model performance versus model size.

While certain arrangements have been described, these arrangements have been presented by way of example only, and are not intended to limit the scope of the inventions. Indeed, the apparatuses* described herein may be embodied in a variety of other forms; furthermore various omissions,

TABLE 3

Evaluation of the proposed Knowledge Transfer techniques for S-Net → T-Net.

| Method | Sky | Building | Road | Side-walk | Fence | Vegetation | Pole | Car | Sign | Pedestrian | Cyclist | Per Class | Global |
|---|---|---|---|---|---|---|---|---|---|---|---|---|---|
| FCN (D) | 77.8 | 67.6 | 86.1 | 35.9 | 35.1 | 89.6 | 8.9 | 86.2 | 41.3 | 17.6 | 10.6 | 50.6 | 71.6 |
| T-Net (TK-L) | 87.7 | 50.6 | 68.8 | 45.4 | 48.7 | 77.2 | 18.6 | 73.1 | 19.4 | 68.8 | 29.3 | 53.5 (2.9) | 62.9 (−8.7) |
| T-Net (TK-SMP) | 85.1 | 65.1 | 87.5 | 21.1 | 35.7 | 85.3 | 6.6 | 90.0 | 45.2 | 53.2 | 55.6 | 57.3 (6.7) | 70.8 (−0.8) |
| T-Net (TK-SMP-Drop) | 87.6 | 75.9 | 79.3 | 43.2 | 27.1 | 80.8 | 4.0 | 86.9 | 19.9 | 68.5 | 14.0 | 53.4 (2.8) | 74.8 (3.2) |
| T-Net (TK-SMP-WCE) | 87.4 | 66.9 | 82.0 | 33.0 | 37.9 | 83.3 | 14.1 | 89.4 | 40.0 | 78.6 | 40.2 | 59.3 (9.1) | 71.8 (0.2) |

5.2 Evaluation of Knowledge Transfer Methods

As summarized in Table 3, results of previous training approaches on T-Net are dramatically improved when applying knowledge transfer methods. For all the transference method we added the unlabelled data from the Google Street View Data Set [17] in order to increase the variability of the S-Net responses during the process, which helps capturing the behaviour of S-Net.

Here we see that the evolution of the transferring techniques is directly correlated to the improvement of the T-Net substitutions and changes in the form of the apparatuses described herein may be made.

REFERENCES

[1] Brostow, G. J., Fauqueur, J., Cipolla, R.: Semantic object classes in video: A high-definition ground truth database. Pattern Recognition Letters 30(2) (2009) 88-97.

[2] Brostow, G. J., Shotton, J., Cipolla, R.: Segmentation and recognition using struc-ture from motion point clouds. In: Eur. Conf. on Computer Vision (ECCV). (2008).

[3] Geiger, A., Lenz, P., Stiller, C., Urtasun, R.: Vision meets robotics: The KITTI dataset. Intl. J. of Robotics Research (2013).
[4] Kundu, A., Li, Y., Dellaert, F., Li, F., Rehg, J. M.: Joint semantic segmentation and 3D reconstruction from monocular video. In: Eur. Conf. on Computer Vision (ECCV) (2014).
[5] Ros, G., Ramos, S., Granados, M., Bakhtiary, A., Vazquez, D., Lopez, A. M.: Vision-based offline-online perception paradigm for autonomous driving. In: Winter Conference on Applications of Computer Vision (WACV) (2015).
[6] Lin, T. Y., Maire, M., Belongie, S., Hays, J., Perona, P., Ramanan, D., Dollar, P., Zitnick, C. L.: Microsoft COCO: Common Objects in Context. In: Eur. Conf. on Computer Vision (ECCV) (2014).
[7] Ess, A., Leibe, B., Schindler, K., Gool, L. V.: Robust multi-person tracking from a mobile platform. IEEE Trans. Pattern Anal. Machine Intell. 31(10) (2009) 1831-1846.
[8] Houben, S., Stallkamp, J., Salmen, J., Schlipsing, M., Igel, C.: Detection of traffic signs in real-world images: The German Traffic Sign Detection Benchmark. In: International Joint Conference on Neural Networks. Number 1288 (2013).
[9] Papandreou, G., Chen, L. C., Murphy, K., Yuille, A. L., Weakly- and semi-supervised learning of a deep convolutional network for semantic image segmentation. In: Intl. Conf. on Computer Vision (ICCV) (2015)).
[10] Ladicky, L., Sturgess, P., Alahari, K., Russell, C., Torr, P. H. S.: What, where and how many? Combining object detectors and CRFs. In: Eur. Conf. on Computer Vision (ECCV). (2010) 427-437).
[11] Long, J., Shelhamer, E., Darrell, T.: Fully convolutional networks for semantic segmentation. In: IEEE Conf. on Computer Vision and Pattern Recognition (CVPR) (2015).
[12] Simonyan, K. and Zisserman, A. Very deep convolutional networks for large-scale image recognition. In: Intl. Conf. on Learning Representations (ICLR) (2015).
[13] Chatfield, K., Simonyan, K., Vedaldi, A., Zisserman, A.: Return of the devil in the details: Delving deep into convolutional networks. In: British Machine Vision Conf. (BMVC) (2014).
[14] He, K., Zhang, X., Ren, S., Sun, J.: Delving deep into rectifiers: Surpassing human-level performance on ImageNet classification. In: Intl. Conf. on Computer Vision (ICCV) (2015).
[15] Le, Q. V., Ngiam, J., Coates, A., Lahiri, A., Prochnow, B., Ng, A. Y.: On optimization methods for deep learning. In: Intl. Conf. on Machine Learning (ICML) (2011).
[16] Zamir, A. R., Shah, M.: Image geo-localization based on multiple nearest neighbor feature matching using generalized graphs. Pattern Analysis and Machine Intelligence, IEEE Transactions on 36(8) (2014) 1546-1558.
[17] Zamir, A., Shah, M.: Image geo-localization based on multiple nearest neighbor feature matching using generalized graphs. (2014).

The invention claimed is:
1. A computer-implemented method for forming a computer system for producing label data for corresponding areas of an input image, the label data being one of a set of predetermined values and being indicative that the corresponding area of the image is an image of an object which is in a respective one of a set of object categories, the method comprising:
adaptively generating a source deconvolutional network defined by a plurality of first values, by supervised learning using training data comprising (i) first image data encoding training images and (ii) for each training image a corresponding set of annotation data, the set of annotation data for each training image indicating, for a plurality of corresponding areas of the training image, that the area of the training image is an image of an object which is in a respective one of the set of object categories;
inputting second image data encoding training images to the source deconvolutional network and collecting corresponding output data describing one or more outputs of the source deconvolutional network;
using the second image data and the output data to generate adaptively a target deconvolutional network defined by a plurality of second values, the cardinality of the second values being lower than that of the first values; and
forming a computer system which implements the target deconvolutional network.
2. A method according to claim 1 in which the collected output data for a given training image is a set of labels indicating, for respective regions of the training image, that the region of the training image shows an object which is a corresponding predefined object category.
3. A method according to claim 1 in which the collected output data for a given training image is a set of vectors, each vector having a number of components equal to the number of object categories, and indicating, for respective region of the training image, a probability value that the region shows an object is in the corresponding object category.
4. A method according to claim 3 in which the adaptive generation of the target deconvolutional network is performed using a cross-entropy loss function which, for a given area of one of the training images encoded by the second image data, is indicative of the cross-entropy between the corresponding outputs of the target deconvolutional network when presented with the training image, and the corresponding outputs of the source deconvolutional network.
5. A method according to claim 4 in which the cross-entropy loss function is calculated by calculating a sum over the object categories of the product of: (a) a term representative of the similarity of a corresponding output of the target deconvolutional network and a source deconvolutional network, and (b) a weighting term for the object category, wherein the weighting term for the object category decreases for increasing frequency of objects of the corresponding object category in the training data.
6. A method according to claim 1 in which, in the adaptive generation of at least one of the source deconvolutional network and the target deconvolutional network, is by a backpropagation algorithm, and wherein, during the algorithm, successive subsets of the values are randomly selected, and an effect on the output of corresponding network of each selected subset of values is successively neglected.
7. A method according to claim 1 in which at least some of the training images of the second image data are training images of the first image data.
8. A method according to claim 1 in which the training data includes a first portion for which the annotation data has a relatively high density, and a second portion for which the annotation data has a relatively low density.

9. A method according to claim 8 in which the step of generating the source deconvolutional network comprises generating a first network component using the first portion of the training data, and generating a second network component using the second portion of the training data, the source deconvolutional network being adapted (i) to transmit image data which is input to the source deconvolutional network, to each of the first and second network components, and (ii) to generate the one or more outputs using the outputs of the first and second network components.

10. A method according to claim 4 in which at least one of the source deconvolutional network and the target deconvolutional network is generated using successive batches of the training data, each batch of training data comprising a plurality of relatively densely-sampled images and a plurality of relatively sparsely-sampled images, and said generation uses a cost function having a first component derived from the relatively densely-sampled images and a second component derived from the relatively sparsely-sampled images.

11. A method according to claim 10 in which the relative importance of the two cost components of the cost function is determined by a weighting parameter.

12. A method according to claim 1 in which the generation of at least one of the source deconvolutional network and the target deconvolutional network uses a cost function which, for each of a plurality of predefined classes of objects, varies inversely with a measure of the frequency of occurrence in the images of objects in each class.

13. A method according to claim 1 in which the computer system comprises an integrated circuit, the method comprising forming the integrated circuit to implement a computational model.

14. A method according to claim 13 in which the integrated circuit is a programmable integrated circuit, the step of forming the integrated circuit to implement the computational model comprising programming the integrated circuit using the second values.

15. A method according to claim 1 in which the image data encodes images of respective road transportation scenes.

16. A computer apparatus for designing a computer system for producing label data for corresponding areas of an input image, the label data being one of a set of predetermined values and being indicative that the corresponding area of the image is an image of an object which is in a respective one of a set of object categories, the computer apparatus comprising a processor and a data storage device storing computer program instructions operative, when followed by the processor, to cause the processor:

to generate a source deconvolutional network defined by a plurality of first values, by supervised learning using training data comprising (i) first image data encoding training images and (ii) for each training image a corresponding set of annotation data, the set of annotation data for each training image indicating, for a plurality of corresponding areas of the training image, that the area of the training image is an image of an object which is in a respective one of the set of object categories;

to calculate output data describing one or more outputs of the source deconvolutional network upon inputting to the source deconvolutional network second image data encoding training images;

to use the second image data and the output data to generate adaptively a target deconvolutional network defined by a plurality of second values, the cardinality of the second values being lower than that of the first values.

17. A computer apparatus according to claim 16 in which the program instructions are operative to cause the processor to collect the output data for a given training image as a set of labels indicating, for respective regions of the training image, that the region of the training image shows an object which is a corresponding predefined object category.

18. A computer apparatus according to claim 16 in which the program instructions are operative to cause the processor to collect the output data for a given training image as a set of vectors, each vector having a number of components equal to the number of object categories, and indicating, for respective region of the training image, a probability value that the region shows an object is in the corresponding object category.

19. A computer apparatus according to claim 18 in which the program instructions are operative to cause the processor to generate the target deconvolutional network using a cross-entropy loss function which, for a given area of one of the training images encoded by the second image data, is indicative of the cross-entropy between the corresponding outputs of the target deconvolutional network when presented with the training image, and the corresponding outputs of the source deconvolutional network.

20. A computer apparatus according to claim 19 in which the program instructions are operative to cause the processor to calculate the cross-entropy loss function by calculating a sum over the object categories of the product of: (a) a term representative of the similarity of a corresponding output of the target deconvolutional network and a source deconvolutional network, and (b) a weighting term for the object category, wherein the weighting term for the object category decreases for increasing frequency of objects of the corresponding object category in the training data.

* * * * *